(12) United States Patent  (10) Patent No.: US 7,546,894 B1
Glenn                      (45) Date of Patent:    Jun. 16, 2009

(54) MOTORCYCLE SUSPENSION FRAME

(76) Inventor: Aaron L. Glenn, 109 S. Nelson Dr., Mustang, OK (US) 73064

( * ) Notice: Subject to any disclaimer, the term of this patent is extended or adjusted under 35 U.S.C. 154(b) by 483 days.

(21) Appl. No.: 11/480,692

(22) Filed: Jul. 3, 2006

(51) Int. Cl.
B62K 11/02 (2006.01)
B62K 19/00 (2006.01)

(52) U.S. Cl. .................. 180/227; 280/274; 280/283

(58) Field of Classification Search ............. 180/219, 180/227, 228; 280/274, 275, 276, 281.1, 280/283, 284
See application file for complete search history.

(56) References Cited

U.S. PATENT DOCUMENTS

| | | | |
|---|---|---|---|
| 4,807,898 | A | 2/1989 | Huntly |
| 5,086,866 | A | 2/1992 | Banjo |
| D378,996 | S | 4/1997 | Ysker |
| D425,453 | S | 5/2000 | Manescalchi |
| 6,142,498 | A | 11/2000 | Smith |
| 6,505,847 | B1 | 1/2003 | Greene |
| 6,837,328 | B2 | 1/2005 | Neugebauer |
| D510,546 | S | 10/2005 | Doll |
| D512,345 | S | 12/2005 | Beich |
| D517,451 | S | 3/2006 | Alsop |

OTHER PUBLICATIONS

Goose; *History of Motorcycle Suspension* www.directparts.com/static/goose/suspension.htm.

*Primary Examiner*—Paul N Dickson
*Assistant Examiner*—Marc A Scharich
(74) *Attorney, Agent, or Firm*—Randal D. Homburg

(57) ABSTRACT

A motorcycle frame has an improved front and rear suspension system incorporating two horizontally placed air bag suspension mechanisms, the motorcycle frame comprising an upper support member having a front backbone tube attached to two rear backbone tubes, a lower support member having a descending front downtube attached to two lower frame rails, an upper support brace attached between the front backbone tube and the descending front downtube, a head tube steering member pivotally attached to the descending front downtube, two rear upright frame members attached between each rear backbone tube and each lower frame rail and a rear axle frame member pivotally attached between the two rear upright frame members to the two lower frame rails. A first air bag suspension mechanism is installed between a front portion of the front backbone tube and the head tube steering member in a horizontal plane to absorb and dampen the vibrations and shock to the front wheel of a motorcycle, while a second air bag suspension mechanism is installed between a rear portion of the front backbone tube and the rear axle frame member.

6 Claims, 3 Drawing Sheets

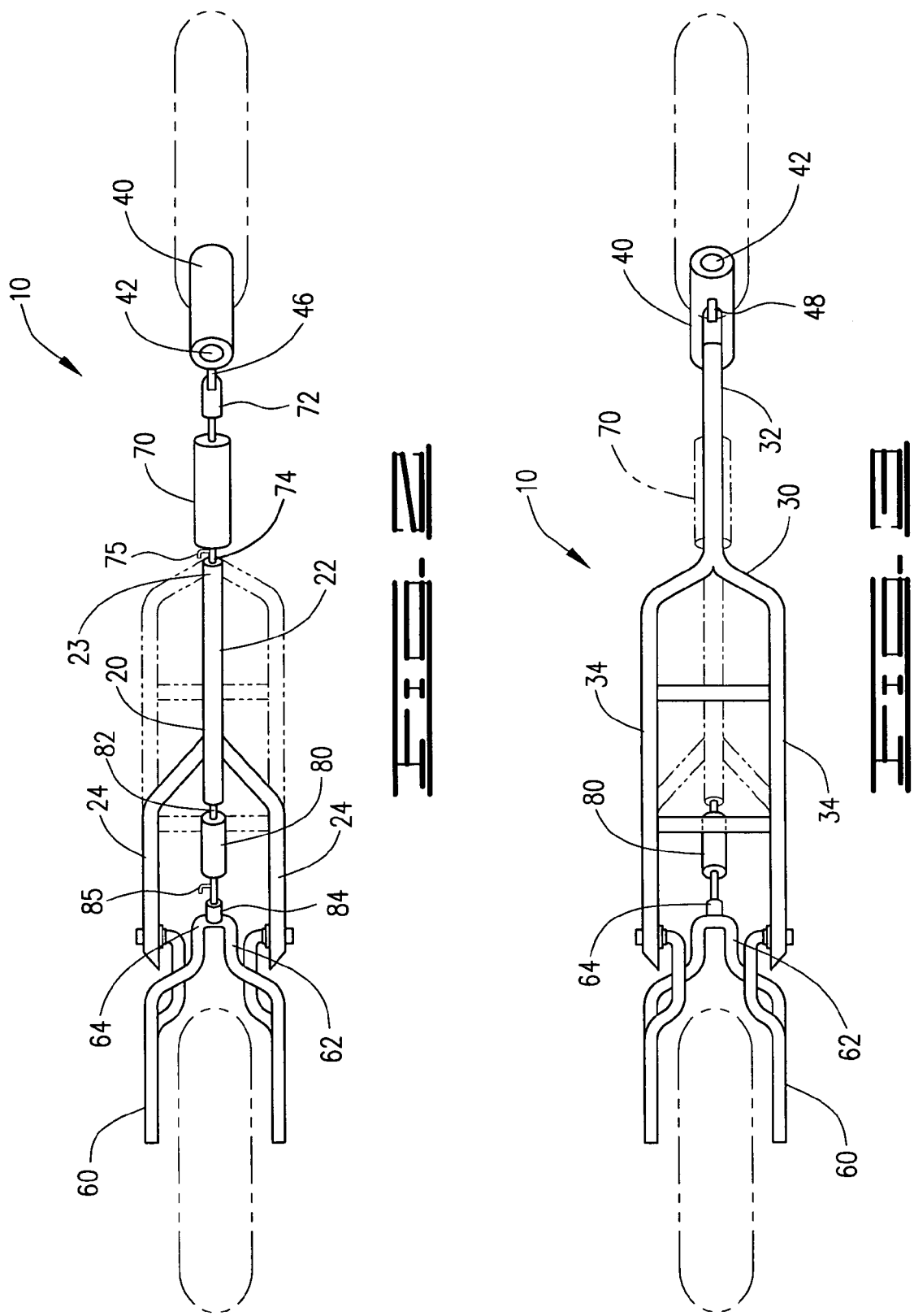

MOTORCYCLE SUSPENSION FRAME

CROSS REFERENCE TO RELATED APPLICATIONS

None

I. Background of the Invention

1. Field of Invention

A motorcycle frame has an improved front and rear suspension system incorporating two horizontally placed air bag suspension mechanisms, the motorcycle frame comprising an upper support member having a front backbone tube attached to two rear backbone tubes, a lower support member having a descending front downtube attached to two lower frame rails, an upper support brace attached between the front backbone tube and the descending front downtube, a head tube steering member pivotally attached to the descending front downtube, two rear upright frame members attached between each rear backbone tube and each lower frame rail and a rear axle frame member pivotally attached between the two rear upright frame members. A first air bag suspension mechanism is installed between a front portion of the front backbone tube and the head tube steering member in a horizontal plane to absorb and dampen the vibrations and shock to the front wheel of a motorcycle, while a second air bag suspension mechanism is installed between a rear portion of the front backbone tube and the rear axle frame member.

2. Description of Prior Art

The following United States patents were discovered and are disclosed within this application for utility patent. All relate to improvements to motorcycle frames.

In U.S. Pat. No. 6,505,847 to Greene, a motorcycle frame is disclosed having two pairs of pivotal joints located in the rear portion of the frame, which allow the motorcycle frame to bend near the rear axle to absorb shock, without exposing a spring or shock member to improve the aesthetic look of the motorcycle.

U.S. Pat. No. 4,807,898 to Huntley, pertain more to a chain driven steering system for a motorcycle, but it also discloses a single upright shock absorber mounted at the front, referenced as a unit 12, is indicated in FIGS. 1 and 13, is mounted between the top of the upper wishbone and the frame, but also makes mention in the specification that the dampening unit may be employed in different positions depending on frame configurations, but does not disclose the alternative components further mentioned in the specification, referenced as a "lower control arm", "cantilever top control arm", or "upper and lower control arms".

U.S. Pat. No. 5,086,866 to Banjo, discloses at least two hydraulic body height adjusters to raise and lower the height of a motorcycle, on mounted at the front steering tube of the motorcycle frame and the other located at the rear portion of the motorcycle frame, both hydraulic height adjusters provided to raise and lower the height of the motorcycle independently or contemporaneously.

II. SUMMARY OF THE INVENTION

The custom motorcycle manufacturing industry and a more diverse and broad ownership of custom motorcycles among a spectrum of enthusiasts choosing aesthetics over pure horsepower has changed the demand in the motorcycle industry for a more sleek and artistic style of motorcycle. This is primarily due to the vast increased media exposure at the present time on several custom motorcycle television shows which appeal to the part-time motorcycle enthusiast who rides a motorcycle for pleasure. Custom motorcycle builders have created and extended motorcycle frames with lower integrated seats and expanded front forks on motorcycles, but little has changed with front and rear suspensions over the years. Front suspensions typically involve basic vertical shock absorbers in the front forks which dampen and reduce the shock in a vertical plane to the front of the motorcycle. However, with the expansion of the front forks forward, these front shocks have become less efficient in reducing the impact to the front of the motorcycle. In addition, the typical motorcycle frame requires exposed rear vertical shocks on the rear portion of the frame to reduce the impact to the seat portion of the motorcycle which is visible from the outside of the motorcycle, commonly called a "softtail", or, in the absence of these rear shocks, is referred to as a "hardtail". Some advancement in rear suspensions has been accomplished, as noted in prior art patents, but the front suspension has gone virtually unchanged, with the front forks generally containing some type of hydraulic or piston suspension in the vertical plane, or along the line of the front forks.

The present motorcycle frame contains the front suspension or single front air bag in a horizontal plane, which places little effect of the distance or angle of the front frame at the steering head on the suspension of the motorcycle and allows for a concealment of the horizontal suspension along the upper portion of the frame and even underneath the gas tank. The dampening of the front portion of the frame along the horizontal plane also reduces the horizontal strain on the front forks allowing them to be longer and extend more forward than would the vertical suspension systems of the prior motorcycle frames or the suspension systems contained within the front forks of the typical motorcycle.

As to the rear suspension disclosed in the present motorcycle frame, it too may be concealed underneath the seat or the rear frame of the motorcycle, with a single horizontal air shock instead of the two vertically placed shocks in the current soft-tail motorcycle frames.

Thus, the primary objective of the present motorcycle suspension frame is to provide an air bag suspension device at the front of a motorcycle frame mounted in a horizontal plane of the frame to reduce and dampen the vibrations and shock to the frame. A second objective is to provide two independent air bag suspension systems at the front and rear of a motorcycle frame where the air bag suspension device are not visible mounted in horizontal planes to reduce and dampen the vibrations and shock to the motorcycle. A third objective is to improve the efficiency of the suspension of the motorcycle frame while allowing for the motorcycle frame to extend in length and increase the potential length between the steering head and the front wheel of the motorcycle. A fourth objective is to reduce the vertical stress placed upon the motorcycle frame and improve the efficiency of the motorcycle frame suspension for custom motorcycle builders. A fifth objective would be to improve the aesthetic presentation of a custom motorcycle by concealing the suspension components of the motorcycle frame behind other motorcycle components.

III. DESCRIPTION OF THE DRAWINGS

The following drawings are submitted with this utility patent application.

FIG. 2 is a top view of the motorcycle frame.

FIG. 3 is a bottom view of the motorcycle frame.

IV. DESCRIPTION OF THE PREFERRED EMBODIMENT

Figure 1:
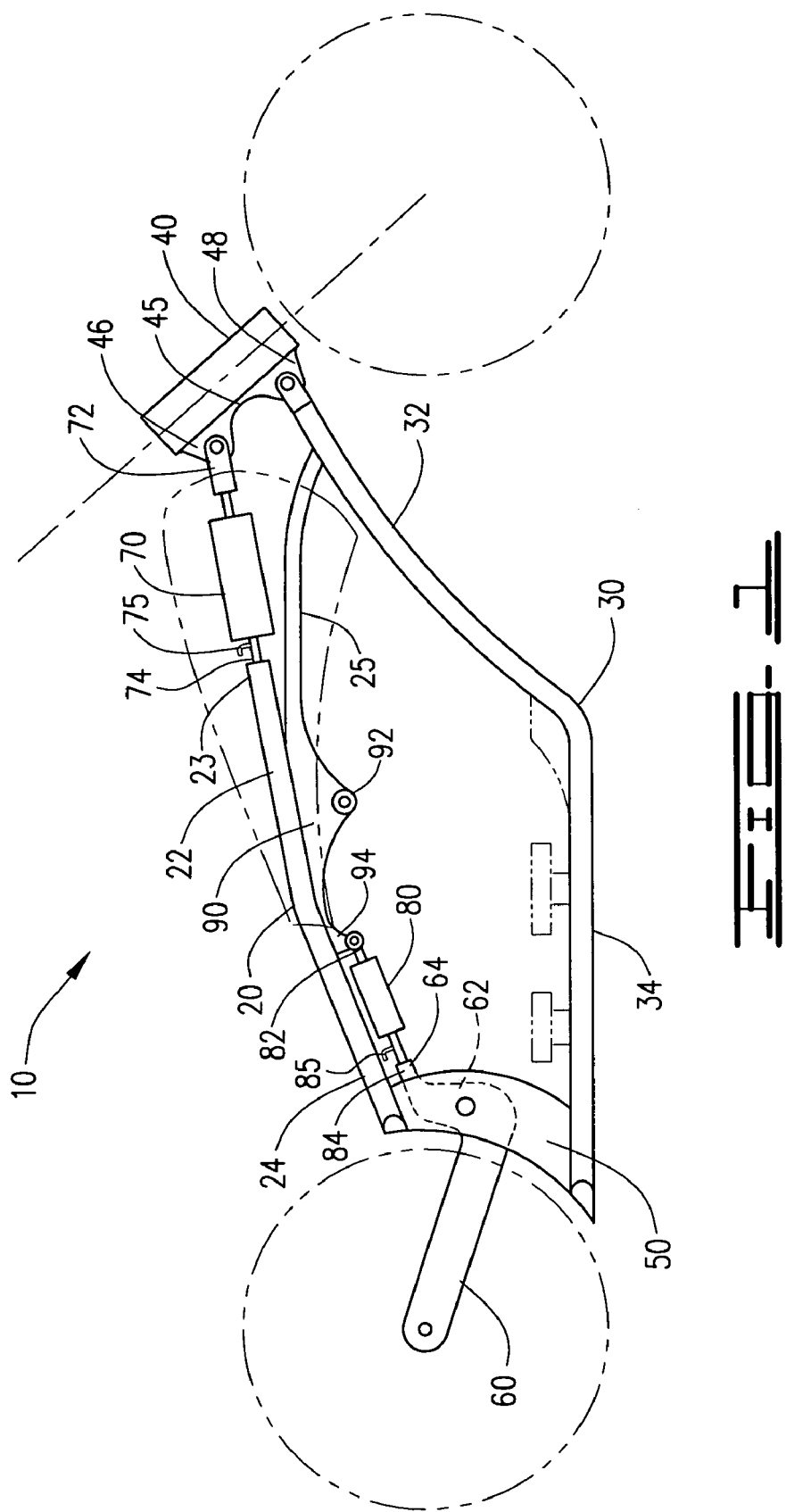
FIG. 1 is a side view of the motorcycle frame.
Figure 4:
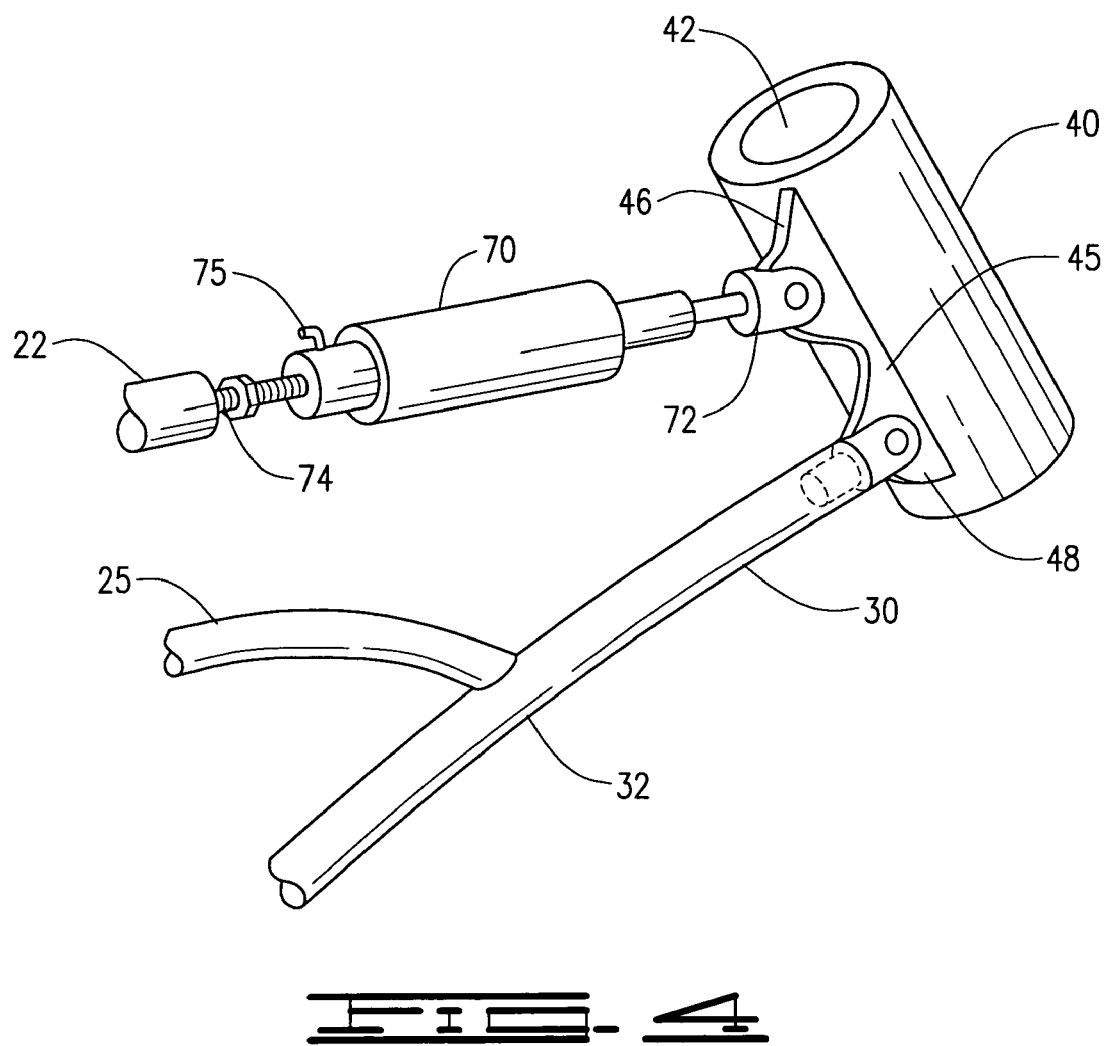
FIG. 4 is an isolation view of the head tube steering member and the pivotal connection to the front air bag suspension mechanism attached to the upper support member and the lower support member.

A motorcycle suspension frame 10 utilized in the construction of a motorcycle, shown in FIGS. 1-4 of the drawings, provides a horizontal suspension system for the front and rear of the motorcycle, the motorcycle suspension frame comprising an upper support member 20 defining a front backbone tube 22 connecting two rear backbone tubes 24, a lower support member 30 defining a descending front downtube 32 connecting two lower frame rails 34, an upper support brace 25 connecting the front backbone tube 22 and the descending front downtube 32, a head tube steering member 40 having an extending rear fin 45 with an upper anchor flange 46 and a lower anchor flange 48, the lower anchor flange 48 pivotally connecting to the descending front downtube 32, two rear upright frame members 50, each rear upright frame member 50 attached between respective rear backbone tubes 24 and lower frame rails 34, a rear axle frame member 60 defining an ascending front neck 62, the rear axle frame member 60 pivotally attached between the two rear upright frame members 50, and at least one first air bag suspension mechanism 70 installed between a front portion 23 of the front backbone tube 22 and the upper anchor flange 46 of the extending rear fin 45 in a first embodiment. A second embodiment includes a second air bag suspension mechanism 80 installed between a motor mount and suspension bracket 90 below the front backbone tube 22 and the ascending front neck 62 of the rear axle frame member 60 while the rear axle frame member 60 is pivotally attached between the rear upright frame members 50.

The upper support member 20 further comprises the motor mount and suspension bracket 90 being attached below the front backbone tube 22 behind the upper support brace 25, the motor mount and suspension bracket further defining a front motor mounting flange 92 and a rear suspension mounting flange 94. The rear suspension mounting flange 94 pivotally attaches a front segment 82 of the second air bag suspension mechanism 80, while a front neck extension 64 extending from the ascending front neck 62 of the rear axle frame member 60 pivotally attaches a rear segment 84 of the second air bag suspension mechanism 80, allowing an extendable connection along a horizontal axis between the rear suspension mounting flange 94 and the rear axle frame member 60. The first air bag suspension mechanism 70 provides an extendable connection along a horizontal axis between the upper support member 20 and the head tube steering member 40, with a front segment 72 of the first air bag suspension member 70 pivotally attached to the upper anchor flange 46 of the extending rear fin 45 of the head tube steering member 60 and a rigid attachment to the front portion 23 of the front backbone tube 22 of the upper support member 20. The motorcycle suspension frame including only the first air bag suspension mechanism 70 would be referred to as a "hardtail" motorcycle frame, and the motorcycle suspension frame including the first and second air bag suspension mechanisms 70, 80 would be referred to as a "softtail" motorcycle frame.

Each first and second air bag suspension mechanism 70, 80 has an independent adjustable stiffness means 75, 85, providing an adjustment of the tension supplied by each air bag suspension mechanism 70, 80, depending on the overall weight of the motorcycle, the size of a front or rear wheel of the motorcycle attached to the motorcycle frame, road conditions or the comfort and preference of the motorcycle. By example, if the roads upon which the motorcycle rider operates are extremely rough, the adjustable stiffness means 75, 85 would be adjusted to apply more tension or resistance to the first and second air bag suspension mechanisms 70, 80 to reduce the vibration or shock to the rider. Where the road conditions are smooth, less tension might be preferred and the adjustable stiffness means 75, 85 would be adjusted accordingly. Also, the weight of the motorcycle rider could be a factor in the determination of the tension supplied to each air bag suspension mechanism. By providing the independent adjustable stiffness means, more liberty may be taken with the overall design of the motorcycle utilizing the suspension frame, providing the motorcycle designer and builder with more broad range of options in the design and construction of the motorcycle. Additionally, the first and second air bag suspension mechanisms are not limited to air bags, although this term has been utilized in this text. Such first and second air bag suspension mechanisms may be provided as air bag shocks, hydraulic fluid filled shocks, air or hydraulic piston and cylinder shocks or mechanical spring tension shocks which have been disclosed in the prior art in the field of shock absorbers which would be adapted to the present motorcycle suspension frame with further modification or adjustment. Those having an independent adjustable tension means already incorporated into the air bag suspension mechanism would be preferred.

The motorcycle suspension frame also includes several standard elements commonly found on other motorcycle frames, including lower motor mounting brackets welded above the lower frame rails, transmission mounts also welded above the lower frame rails, and the head tube steering member 40 having a longitudinal hollow bore 42 which contains the front steering tube or a portion of the triple tree further connected to the front wheel and handlebars. This head tube steering member 40 would contain a front steering system which is a hub-centered steering front end mechanism or the more standard telescoping fork steering system, and allows for the motorcycle builder to have a wide range of options when determining the rake or angle of the steering head measured in degrees from a line 90 degrees to the ground, from a nearly vertical extension to an extension with a more forward pronouncement. With the first air bag suspension mechanism 70, no vertical shock absorbers would be required within the front fork tubes, although vertical shock absorbers could still be located within the front fork tubes in addition to the first air bag suspension mechanism 70 in the present motorcycle suspension frame.

Any suitable motor, transmission and drive mechanism can be mounted within the frame upon the lower frame rails 34, a front wheel attached to the front steering system, a rear wheel is attached to the rear axle frame member 60, a seat is place on the frame above the rear backbone tubes 24, a gas tank is located above the front backbone tube 22 and over the front air bag suspension mechanism 70. However, these standard items are attached in any manner the motorcycle builder chooses, giving the motorcycle builder the option to customize the motorcycle to the taste and choosing of the purchaser or customer.

While the invention has been particularly shown and described with reference to a preferred embodiment thereof, it will be understood by those skilled in the art that changes in form and detail may be made therein without departing from the spirit and scope of the invention.

What is claimed is:

1. A motorcycle suspension frame utilized in the construction of a motorcycle contains a horizontal suspension system for a motorcycle, the motorcycle suspension frame comprising:
   an upper support member defining a front backbone tube connecting two rear backbone tubes;
   a lower support member defining a descending front downtube connecting two lower frame rails;
   an upper support brace connecting said front backbone tube and said descending front downtube;
   a head tube steering member having an extending rear fin with an upper anchor flange and a lower anchor flange, said lower anchor flange pivotally connecting to said descending front downtube;
   two rear upright frame members, each rear upright frame member attached between respective said rear backbone tubes and said lower frame rails;
   a rear axle frame member defining an ascending front neck, said rear axle frame member pivotally attached between said two rear upright frame members; and
   a first air bag suspension mechanism installed between a front portion of said front backbone tube and said upper anchor flange of said extending rear fin.

2. The motorcycle suspension frame as disclosed in claim 1, further comprising:
   said first air bag suspension mechanism defining an extendable connection between said upper support member and said head tube steering member, said first air bag suspension mechanism having a front segment pivotally attached to said upper anchor flange of said extending rear fin of said head tube steering member and a rear segment rigidly attached to said front portion of said front backbone tube of said upper support member.

3. The motorcycle suspension frame as disclosed in claim 1 wherein the first air bag suspension mechanism has an adjustable stiffness means providing an adjustment of tension supplied by said air bag suspension mechanism.

4. A motorcycle suspension frame utilized in the construction of a motorcycle contains a horizontal suspension system for front and rear of the motorcycle, the motorcycle suspension frame comprising:
   an upper support member defining a front backbone tube connecting two rear backbone tubes,
   a lower support member defining a descending front downtube connecting two lower frame rails,
   an upper support brace connecting said front backbone tube and said descending front downtube,
   a head tube steering member having an extending rear fin with an upper anchor flange and a lower anchor flange, said lower anchor flange pivotally connecting to said descending front downtube,
   two rear upright frame members, each rear upright frame member attached between respective said rear backbone tubes and said lower frame rails,
   a rear axle frame member defining an ascending front neck, said rear axle frame member pivotally attached between said two rear upright frame members,
   a first air bag suspension mechanism installed between a front portion of said front backbone tube and said upper anchor flange of said extending rear fin; and
   a second air bag suspension mechanism installed between a motor mount and suspension bracket welded below said front backbone tube and said ascending front neck of said rear axle frame member.

5. The motorcycle suspension frame, as disclosed in claim 4, further comprising:
   said motor mount and suspension bracket being attached below said front backbone tube behind said upper support brace, said motor mount and suspension bracket further defining a front motor mounting flange and a rear suspension mounting flange, said rear suspension mounting flange being pivotally attached to a front segment of said second air bag suspension mechanism, and a front neck extension extending from said ascending front neck of said rear axle frame member being pivotally attached to a rear segment of said second air bag suspension mechanism, therefore defining an extendable connection between said rear suspension mounting flange and said rear axle frame member, and
   said first air bag suspension mechanism defining an extendable connection between said upper support member and said head tube steering member, said first air bag suspension mechanism having a front segment pivotally attached to said upper anchor flange of said extending rear fin of said head tube steering member and a rear segment rigidly attached to said front portion of said front backbone tube of said upper support member.

6. The motorcycle suspension frame as disclosed in claim 4 wherein each said first and second air bag suspension mechanism have an adjustable stiffness means providing an adjustment of tension supplied by said air bag suspension mechanism.

* * * * *